(12) United States Patent
Tung

(10) Patent No.: US 7,379,992 B2
(45) Date of Patent: May 27, 2008

(54) NETWORK SYSTEM AND METHOD FOR REDUCING POWER CONSUMPTION

(75) Inventor: Chung-Chih Tung, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 756 days.

(21) Appl. No.: 11/017,323

(22) Filed: Dec. 20, 2004

(65) Prior Publication Data

US 2006/0136562 A1 Jun. 22, 2006

(51) Int. Cl.
*G06F 15/16* (2006.01)
(52) U.S. Cl. .................................. 709/223; 709/226
(58) Field of Classification Search ........ 709/200–203, 709/217–227
See application file for complete search history.

(56) References Cited

U.S. PATENT DOCUMENTS

| | | | | |
|---|---|---|---|---|
| 6,111,909 A | * | 8/2000 | Taki | 375/132 |
| 6,351,820 B1 | * | 2/2002 | Oh-Yang et al. | 713/323 |
| 2004/0121793 A1 | * | 6/2004 | Weigele et al. | 455/522 |
| 2006/0129675 A1 | * | 6/2006 | Zimmer et al. | 709/225 |

* cited by examiner

*Primary Examiner*—Moustafa M Meky
(74) *Attorney, Agent, or Firm*—Quintero Law Office

(57) ABSTRACT

A method for reducing power consumption, adapted to a network system comprising a server provided with a domain name and being able to operate in a reduced power mode. When a request for the domain name is received, a wake-up signal is sent to the server for switching the server to a normal mode, and an IP address corresponding to the server name is then assigned in response to the inquiry request.

10 Claims, 2 Drawing Sheets

NETWORK SYSTEM AND METHOD FOR REDUCING POWER CONSUMPTION

BACKGROUND

The invention relates to a network system, and in particular to a network system and method for reducing power consumption of a network server.

Data transmitted through a network can be text, audio, image, and even video files which require wider transmission bandwidth.

Presently, personal computers connect to the Internet through cable or asymmetric digital subscriber line (ADSL) modems. With the expanded bandwidth, users have increasingly employed home network servers for hosting websites or email servers.

The number of Internet Protocol (IP) addresses provided to computer devices, however, is limited and fixed, and addresses are not always available. Thus, a provisional IP address (i.e. dynamic IP address) is randomly provided, by an Internet service provider (ISP), to a computer device whenever the computer device connects to the Internet through a modem. After the connected computer device disconnects from the Internet, the dynamic IP address will be provided to another computer device connected to the Internet. To build a network server using a dynamic IP address, a domain name server able to dynamically regulate domain names and corresponding relationships for IP addresses is required. When a personal computer acting as a network server connects to the Internet, the computer transmits its own IP address provided by an ISP to the domain name server, and the domain name server then links the IP address and a previously registered domain name by the Internet user. Thus, the domain name server can respond to request for the domain name of the personal computer with the provided IP address.

Although personal computers can act as network servers using a broadband connection, the frequency of service requests for same is much lower than for enterprise servers acting as network servers. Further, the personal computers must always remain active but are generally idle, resulting in needless power consumption.

SUMMARY

Accordingly, the invention provide a network system and method for reducing power consumption, enabling a network server to operate in a sleep mode or a power saving mode only activating when receiving a request.

Accordingly, the invention discloses a method for reducing power consumption, adapted to a network system comprising a server, the server provided with a domain name and capable of operating in a reduced power mode. When a request for the domain name is received, a wake-up signal is sent to the server for switching the server to a normal mode, and an IP address corresponding to the server name is then assigned in response to the request.

Also disclosed is a network system for reducing power consumption, comprising a network server and a domain name server. The network server is provided with a domain name and operates in a reduced power mode. When receiving a request for the domain name, the domain name server sends a wake-up signal to the network server for switching the network server to a normal mode, and assigns an IP address corresponding to the server name in response to the request.

A detailed description is given in the following embodiments with reference to the accompanying drawings.

BRIEF DESCRIPTION OF THE DRAWINGS

Embodiments of the invention can be more fully understood by reading the subsequent detailed description and examples with reference made to the accompanying drawings, wherein.

DETAILED DESCRIPTION

Figure 1:
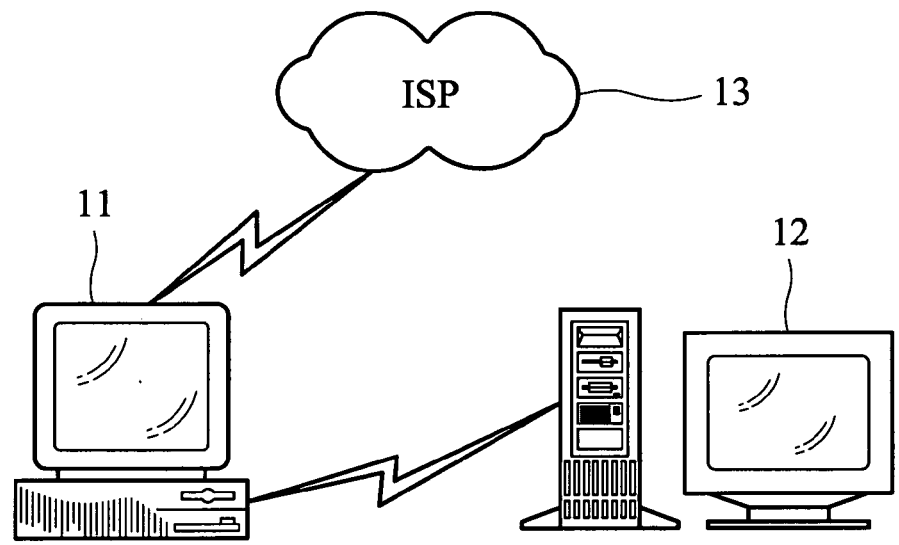
FIG. 1 is a schematic diagram showing operations between a network server with an ISP and domain name server according to an embodiment of the invention.
Figure 2:
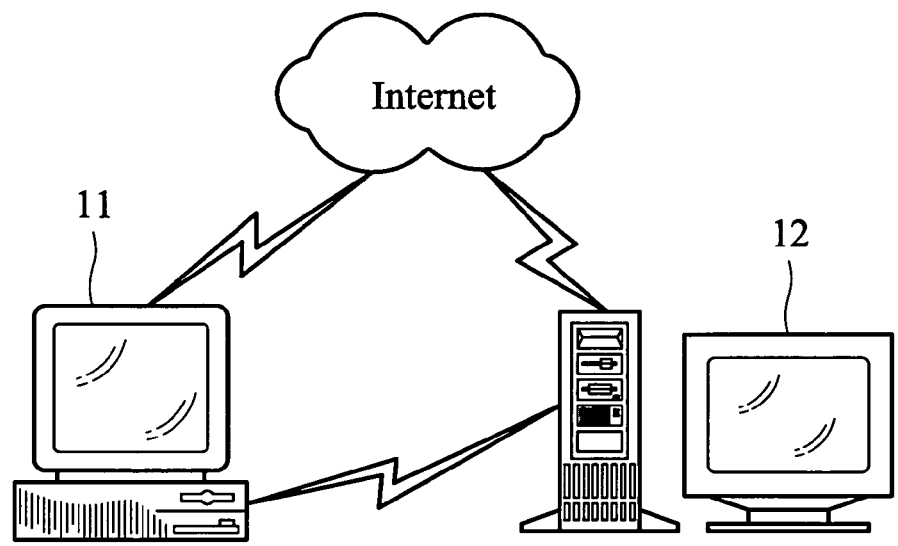
FIG. 2 is a schematic diagram showing operations between a network server and domain name server over the Internet according to an embodiment of the invention.

FIGS. 1 and 2 are schematic diagrams showing operations between a network server and domain name server according to an embodiment of the invention.

As shown in FIG. 1, a network system of the invention comprises a personal computer 11 as a network server and a domain name server 12. A domain name, "home.com" for example, provided to personal computer 11 is stored in domain name server 12. Personal computer 11 connects to the Internet using a dial-up connection to an ISP 13 through a modem (cable or ADSL modem). ISP 13 randomly assigns an IP address, "203.56.56.56" for example, to personal computer 11 via dynamic IP addressing. When receiving the IP address, personal computer 11 transmits the IP address to domain name server 12, and domain name server 12 links the IP address "203.56.56.56" and the domain name "home.com".

As shown in FIG. 2, personal computer 11 connects to the Internet and operates in a reduced power mode when not receiving any service request from the Internet. When a service request is received via a personal network server 11 (i.e. personal computer 11), the Internet user sends a request for the domain name "home.com" to domain name server 12. Domain name server 12 sends a wake-up signal to the network server (personal computer 11) represented by the domain name to wake up personal computer 11 from the suspended state, enabling personal computer to operate in a normal mode. Next, domain name server 12 assigns an IP address "203.56.56.56" corresponding to personal computer 11 according to built-in domain names and corresponding relationships for IP addresses, and responds to the request with the assigned IP address.

Figure 3:
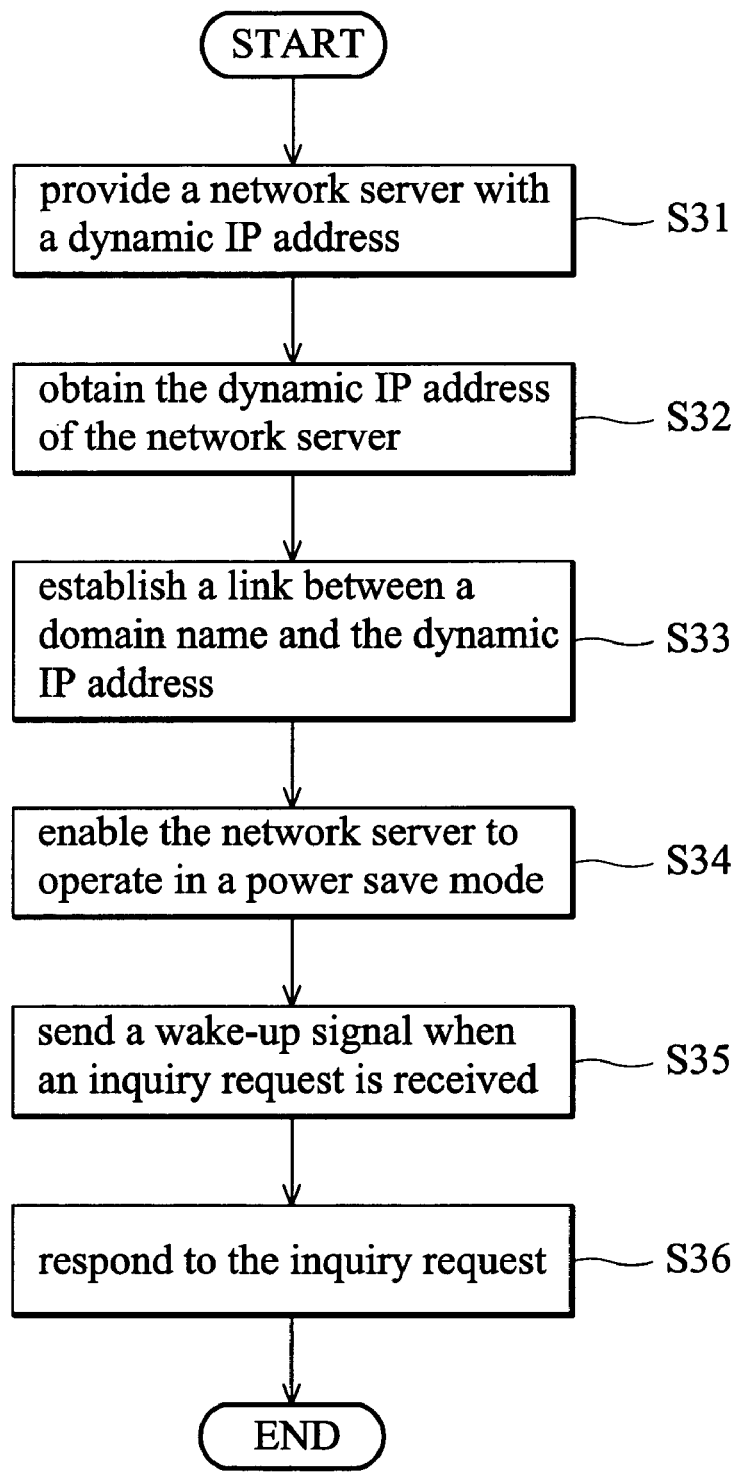
FIG. 3 is a flowchart of the method for reducing power consumption according to an embodiment of the invention.

FIG. 3 is a flowchart of the method for reducing power consumption according to an embodiment of the invention.

In step S31, a network server obtains a dynamic IP address from an ISP.

In step S32, a domain name server obtains the dynamic IP address.

In step S33, the domain name server establishes a link between a domain name of the network server and the dynamic IP address.

In step S34, the network server is enabled to operate in a reduced power mode.

In step S35, when a request for the domain name is received, a wake-up signal is sent to the network server for switching the network server to a normal mode, and an IP address corresponding to the server name is assigned according to the link.

In step S36, the domain name server responds to the request with the assigned IP address.

A domain name server of embodiments of the invention executes an inquiry for a corresponding domain name, and sends a wake-up signal to a network server before responding to a request, thus waking the network server up before the network server is required to provide services. As a result, the network server can operate in a reduced power mode, when no service requests are received to reduce power consumption.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing power consumption, adapted to a network system comprising a server provided with a domain name and capable of operating in a reduced power mode, the method comprising:
    enabling the server to operate in the reduced power mode;
    when a request for the domain name is received, sending a wake-up signal to the server for switching the server to a normal mode, and assigning an IP address corresponding to the server name; and
    responding to the request with the IP address.

2. The method as claimed in claim 1, wherein the server is a personal computer.

3. The method as claimed in claim 1, wherein the IP address is a dynamic IP address.

4. The method as claimed in claim 3, further comprising:
    obtaining the dynamic IP address of the server; and
    providing up a link between the dynamic IP address and domain name.

5. The method as claimed in claim 1, wherein the server obtains the IP address through an Internet service provider.

6. A network system for reducing power consumption, comprising:
    a network server, provided with a domain name and operating in a reduced power mode; and
    a domain name server, when receiving a request for the domain name, sending a wake-up signal to the network server for switching the network server to a normal mode, and assigning an IP address corresponding to the server name in response to the request.

7. The system as claimed in claim 6, wherein the network server is a personal computer.

8. The system as claimed in claim 6, wherein the IP address is a dynamic IP address.

9. The system as claimed in claim 8, wherein the domain name server obtains the dynamic IP address of the network server provides a link between the dynamic IP address and domain name.

10. The system as claimed in claim 6, wherein the network server obtains the IP address through an Internet service provider.

* * * * *